United States Patent [19]

Spiker

[11] Patent Number: 4,593,624
[45] Date of Patent: Jun. 10, 1986

[54] POWER AND FREE CONVEYOR

[75] Inventor: Michael G. Spiker, Lansing, Mich.

[73] Assignee: Planet Corporation, Lansing, Mich.

[21] Appl. No.: 700,181

[22] Filed: Feb. 11, 1985

[51] Int. Cl.[4] ............................................ B61B 10/02
[52] U.S. Cl. .................................................. 104/172 B
[58] Field of Search .............. 104/165, 172 S, 172 R, 104/172 B

[56] References Cited

U.S. PATENT DOCUMENTS

| | | | |
|---|---|---|---|
| 3,079,872 | 3/1963 | Birkhead | 104/172 S |
| 3,091,191 | 5/1963 | Fur | 104/172 S |
| 3,247,806 | 5/1964 | Dehne | 104/172 S |
| 3,282,445 | 8/1960 | Wallace, Jr. | 414/144 |
| 3,314,378 | 7/1967 | Potter | 104/96 |
| 3,332,359 | 7/1967 | Leach | 104/96 |
| 3,332,360 | 7/1967 | Leach | 104/96 |
| 3,347,171 | 10/1967 | Torrance | 104/172 S |
| 3,348,496 | 10/1965 | Klamp et al. | 104/96 |
| 3,375,790 | 4/1968 | Bishop | 104/172 S |
| 3,397,650 | 10/1968 | Kondur et al. | 104/172 S |
| 3,415,202 | 1/1966 | Dehne | 104/242 |
| 3,420,188 | 2/1966 | Dehne et al. | 104/172 S |
| 3,425,136 | 2/1969 | Bishop | 104/172 BT |
| 3,426,700 | 2/1969 | Klamp | 104/94 |
| 3,437,054 | 4/1969 | Bishop | 104/178 |
| 3,451,352 | 2/1966 | Curry et al. | 104/172 S |
| 3,503,337 | 5/1967 | Haase | 104/172 S |
| 3,518,946 | 1/1968 | Kavieff | 104/172 B |
| 3,523,504 | 8/1970 | Jones | 104/172 S |
| 3,541,967 | 11/1970 | Birkhead | 104/172 S |
| 3,559,586 | 2/1971 | Follrath | 104/172 S |
| 3,706,286 | 12/1972 | Ricaud et al. | 104/172 S |
| 3,774,546 | 11/1973 | Krammer | 104/172 S |
| 3,814,024 | 6/1974 | Peter | 104/172 S |
| 3,818,840 | 6/1974 | Dehne | 104/172 S |
| 3,926,125 | 12/1975 | Orwin | 104/172 S |
| 3,948,186 | 4/1976 | McCaul | 104/172 S |
| 4,058,064 | 11/1977 | Wilder et al. | 104/172 S |
| 4,143,599 | 3/1979 | Krammer | 104/172 S |
| 4,147,110 | 4/1979 | Knudsen | 104/172 S |
| 4,354,435 | 10/1982 | Wakabayashi | 104/172 S |
| 4,424,749 | 1/1984 | Wakabayashi | 104/172 S |
| 4,433,628 | 2/1984 | Wakabayashi | 104/172 S |
| 4,456,117 | 6/1984 | Szczepanski | 104/172 B |
| 4,461,216 | 7/1984 | Carney | 104/172 B |
| 4,462,315 | 7/1984 | Wakabayashi | 104/172 S |

FOREIGN PATENT DOCUMENTS

| | | | |
|---|---|---|---|
| 612795 | 11/1948 | United Kingdom | 104/165 |
| 801898 | 9/1958 | United Kingdom | 104/172 S |
| 872401 | 7/1961 | United Kingdom | 104/172 B |
| 197131 | 4/1966 | U.S.S.R. | 104/165 |
| 701879 | 12/1979 | U.S.S.R. | 104/172 S |

Primary Examiner—Robert B. Reeves
Assistant Examiner—Dennis C. Rodgers
Attorney, Agent, or Firm—Ian C. McLeod

[57] ABSTRACT

A releasing device and dog member for a power and free type of conveyor is described. The releasing device includes a rod (105, 205) which is linearly moveable upon engaging a stop or a truck (17) with a buttress plate (105a, 205a) on the rod to disengage a retaining plate (100a, 200a) on a pivotal dog (100, 200), thereby allowing the dog to pivot away from a pusher member (12). An extending device, such as spring (108) or camming member (209), urges the rod to an extended position when the stop or forward truck is removed from engagement with the buttress plate.

21 Claims, 7 Drawing Figures

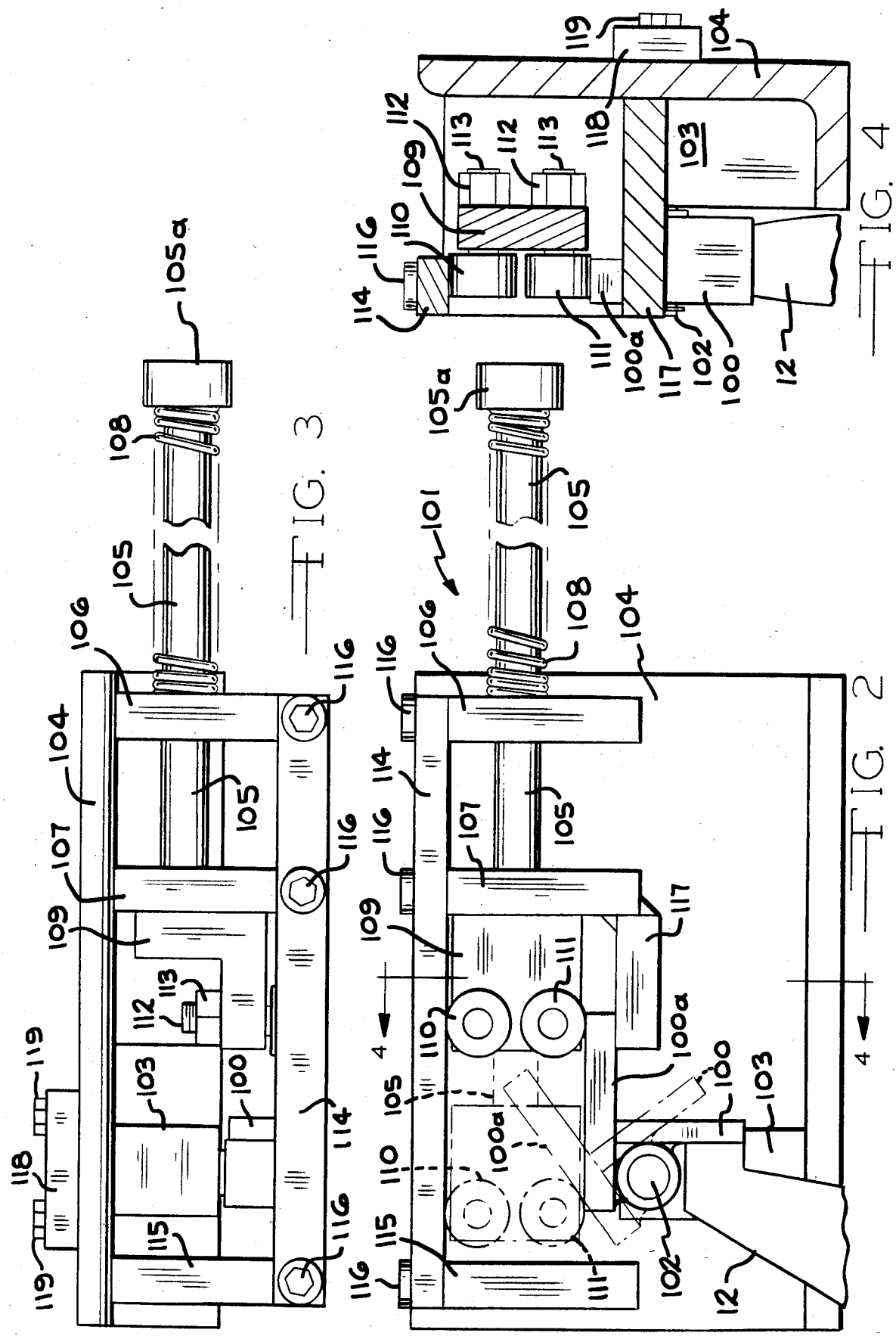

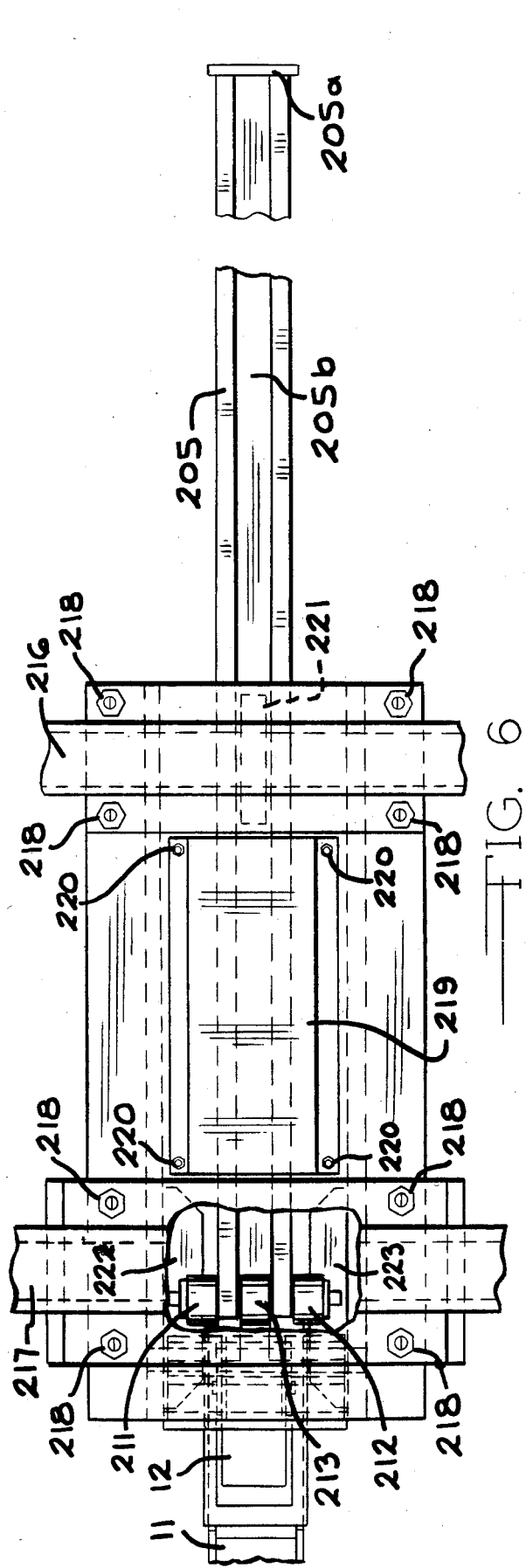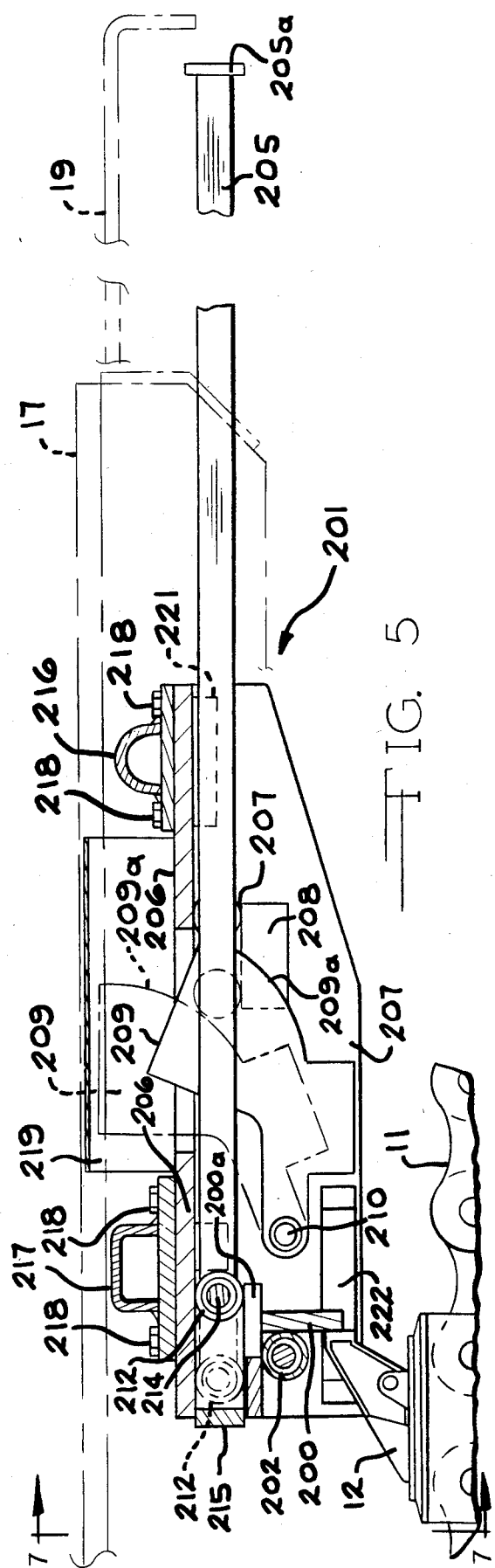

POWER AND FREE CONVEYOR

BACKGROUND OF THE INVENTION (1) Field of the Invention

The present invention relates to a power and free conveyor with a releasing means for a pivotal dog means driven by a pusher means. In particular, the present invention relates to a releasing means including a linearly moveable rod which engages a retaining plate on the pivotal dog means so as to provide power to the conveyor and upon movement of the rod disengages the retaining plate to free the dog means.

(2) Prior Art

The prior art has described many different types of releasing means for power and free conveyors. Illustrative is U.S. Pat. No. 3,518,946 to Kavieff which shows a pusher conveyor 28 and a tow trolly unit 26 with pushers 36. This type of unit is reliable but expensive and is not adapted for retrofitting existing non-power and free conveyor systems which use only a pusher means on a conveyor and a dog means on the carrier. Other power and free conveyors are shown in U.S. Pat. Nos. 3,314,378 to Potter et al; 3,348,496 to Klamp et al; 3,397,650 to Kondur et al; 3,415,202 to Dehne; 3,420,188 to Dehne et al; 3,451,352 to Curry et al; 3,503,337 to Haase; 3,559,586 to Follrath; 3,774,546 to Krammer; 3,814,024 to Peter; 3,818,840 to Dehne; 3,926,125 to Orwin; 3,948,186 to McCaul; 4,058,064 to Wilder et al; 4,143,599 to Krammer; 4,147,110 to Knudsen; 3,079,872 to Birkhead; 3,247,806 to Dehne; 3,282,445 to Wallace, Jr ; 3,332,359 to Leach; 3,332,360 to Leach; 3,347,171 to Torrance; 3,375,790 to Bishop; 3,425,361 to Bishop; 3,426,700 to Klamp; 3,437,054 to Bishop; 3,518,946 to Kavieff; 3,523,504 to Jones; 3,541,967 to Birkhead; 4,354,435 to Wakabayashi; 4,424,749 to Wakabayashi; 4,433,628 to Wakabayashi; 4,456,117 to Szczepanski; 4,461,216 to Carney; 4,462,315 to Wakabayashi. As can be seen from these patents, the releasing means are relatively complicated.

OBJECTS

It is therefore an object of the present invention to provide a power and free conveyor having a fail safe releasing means and dog means which interact reliably together to provide a controlled accumulation of trucks or conveyors. Further it is an object of the present invention to provide a relatively inexpensive releasing means and dog means. Further still it is an object of the present invention to provide a releasing means and dog means which can be retrofitted to existing non-power and free conveyor systems. These and other objects will become increasingly apparent from the following description and the drawings.

IN THE DRAWINGS

FIG. 2 is a front view of the releasing means and dog means shown in FIG. 1 particularly illustrating a spring (108) as an extending means for a rod (105) as the releasing means.

FIG. 3 is a plan view of the releasing means and dog means shown in FIG. 2.

FIG. 4 is a right end cross-sectional view along line 4—4 of FIG. 2 showing the releasing means and dog means.

FIG. 5 is a front view of the preferred releasing means for the dog means (200) wherein a counterweight (209) acts as the extending means for a rod (205).

FIG. 6 is a plan view of the releasing means shown in FIG. 5, particularly showing bearing means (211, 212, 213) on the end of the rod (205) which engages and disengages a retaining (200a) plate on the dog means (200).

GENERAL DESCRIPTION

Figure 1:
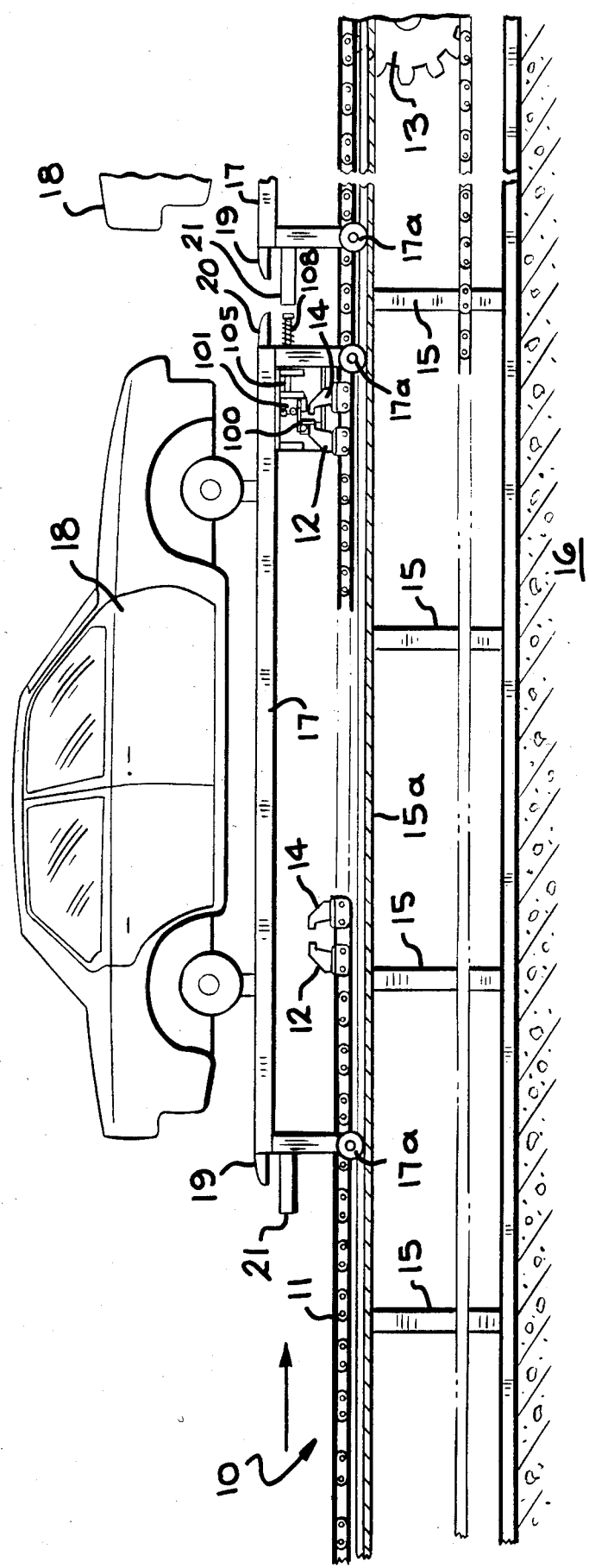
FIG. 1 is a front view showing a rearward carrier (17) carrying an autobody which is moveable in a forward direction (shown by arrow) and is about to engage a forward carrier (17) carrying a second autobody (18) and particularly showing a releasing means (101) and dog means (100) for accumulating the carriers.

The present invention relates to a power and free conveyor of the type having a carrier (17) supported on at least one track (15a) which is moved along the track in a forward direction by a pusher means (12) mounted on a propelling member (11) adjacent the track which engages a dog means on the carrier, wherein the dog means on the carrier is releasable so as to accumulate the carrier when a releasing means on the carrier engages an obstacle in the path of the carrier to release the dog means the improvement in the releasing means and dog means which comprises:

a linearly moveable rod (105, 205) mounted on the carrier in the forward direction as the releasing means, wherein the rod moves from an extended position to a depressed position along a longitudinal axis of the rod when an obstacle is engaged by the rod;

dog means (100, 200) mounted on the carrier so as to be pivotal on a pivot axis perpendicular to the longitudinal axis of the rod, the dog means having a retaining plate (100a, 200a) extending from adjacent to the pivot axis in the forward direction and mounted on the carrier so that when the rod is in an extended position an end portion of the rod engages the retaining plate to prevent pivoting of the dog means when engaged by the pusher means and wherein when the rod is in a depressed position the retaining plate is disengaged from the end portion of the rod so that the dog means pivots when engaged by the pusher means thus allowing stopping of the carrier on the track without stopping the propelling member thereby allowing accumulation of the carriers; and extending means (108, 209) which urges the rod to the extended position when the obstacle is disengaged from the rod. It will be appreciated that the propelling member can also have a hold back dog (14) as is known in the art.

The present invention also relates to an article carrier or truck (17) with wheels (17a) adapted to be supported on one or more tracks (15a) to be moved in a forward direction by a pusher means (12) mounted on a propelling member (11) adjacent the track which engages a dog means on the truck, wherein dog means on the truck is releasable so as to accumulate the truck on the tracks when a releasing means on the truck engages an obstacle in the path of the truck the improvement in the releasing means mounted on the truck which comprises:

a linearly moveable rod (105, 205) mounted on the truck in the forward direction, wherein the rod moves from an extended position to a depressed position along longitudinal axis of the rod when an obstacle is engaged by the rod;

dog means (100, 200) mounted on the truck so as to be pivotal on a pivot axis perpendicular to the longitudinal axis of the rod, the dog means having a retaining plate (100a, 200a) extending from adjacent to the pivot axis in the forward direction and mounted on the truck so that when the rod is in an extended position an end portion of the rod engages the retaining plate to prevent pivoting of the dog when engaged by the pusher means and wherein when the rod is in a depressed position the retaining plate is disengaged from the end portion of the rod so that the dog means pivots when engaged by the pusher means, thus allowing accumulation of the truck on the track; and extending means (108, 209) which urges the rod to the extended position when the obstacle is disengaged from the rod.

Finally the present invention relates to a releasing means for a power and free conveyor of the type having a carrier (17) supported on at least one track (15a) which is moved along the track in a forward direction by a pusher means (12) mounted on a propelling member adjacent the track which engages a dog means on the carrier, wherein the dog means on the carrier is releasable so as to accumulate the carrier when a releasing means on the carrier engages an obstacle in the path of the carrier to release the dog means the improvement in the releasing means and dog means which comprises:

a linearly moveable rod (105, 205) mounted on the carrier in the forward direction, wherein the rod moves from an extended position to a depressed position along a longitudinal axis of the rod when an obstacle is engaged by the rod;

dog means (100, 200) mounted on the carrier so as to be pivotal on a pivot axis perpendicular to the longitudinal axis of the rod, the dog means having a retaining plate (100a, 200a) extending from adjacent to the pivot axis in the forward direction and mounted on the carrier so that when the rod is in an extended position an end portion of the rod engages the retaining plate to prevent pivoting of the dog means when engaged by the pusher means and wherein when the rod is in a depressed position the retaining plate is disengaged from the end portion of the rod so that the dog means pivots when engaged by the pusher means thus allowing accumulation of the carrier on the track; and extending means (108, 209) which urges the rod to the extended position when the obstacle is disengaged from the rod.

SPECIFIC DESCRIPTION

Referring to FIG. 1, a conventional conveyor 10 is shown. It can be a chain link 11 type as shown with rollers between the links (not shown) which are carried on a bar (not shown) or a chain on edge type conveyor or any other type of propelling means. Pushers 12 are mounted on the chain 11 in a conventional manner. The chain 11 is driven by a sprocket 13. A hold back dog 14 is mounted on the chain 11 to prevent unrestrained forward movement of a truck or carrier 17 on a downward incline. The chain 11 is mounted on a frame 15 supported on a foundation 16. The chain 11 could also be supported directly by the foundation 16 (not shown). The frame 15 supports two parallel tracks 15a which mount trucks 17 on wheels 17a. Articles to be conveyed, such as the autobodies 18, are supported on trucks 17. The trucks 17 includes rearward and forward step plates 19 and 20 which overhang the ends of the trucks 17. On the rear of each truck 17 are pusher bars 21 projecting in the rearward direction.

The details of the dog means 100 and releasing means 101 are shown in FIGS. 2 to 4. The dog means 100 is pivotally mounted on a pivot pin 102 so as to allow the moving pusher means 12 to rotate the dog means 100 as the chain 11 moves. The pivot pin 102 is mounted on a bar 103 supported by a support 104.

The dog means 100 includes a retaining plate 100a which pivots on the pivot pin 102 as shown by the dotted lines in FIG. 2. The releasing means 101 includes a rod 105 which supported by journal members 106 and 107 for linear movement perpendicular to the axis of the pivot pin 102 and parallel to the retaining plate 100a. The rod 105 is biased to an extended position by coil spring 108. The rod 105 is provided with a buttress plate 105a which engages a pusher bar 21 (FIG. 1). At the opposite end of the rod 15 from the buttress plate 105a, a camming head 109 is mounted so as to abut journal member 107. Rollers 110 and 111 are mounted on camming head 109 by studs 112 and nuts 113. The roller 110 engages a face plate 114. The face plate 114 is secured to journal members 106 and 107 and to a support 115 on support 104 by means of bolts 116. The roller 111 engages the retaining plate 100a in the extended position. A stop plate 117 engages the retaining plate 100a so that when the rod 105 is extended, the stop plate 117 and roller 111 engage the retaining plate 100a. The pivot pin 102 is supported by a face plate 118 secured to the outside of the support 104 by means of bolts 119.

As can be seen from FIG. 2, the rod 105 is pushed back with roller 111 on the retaining plate 100a, thereby releasing the dog means 100 for pivoting by the pusher 12. This occurs when the pusher bar 21 engages buttress plate 105a of rod 105. The truck 17 is then released from movement in the forward direction. When the pusher rod 21 disengages from the buttress plate 105a, the rod 105 is extended by spring 108, thereby reengaging the roller 111 with the retaining plate 100a to prevent pivoting of the dog means 100 by the pusher 12. The truck 17 then progresses in the forward direction.

Figure 7:
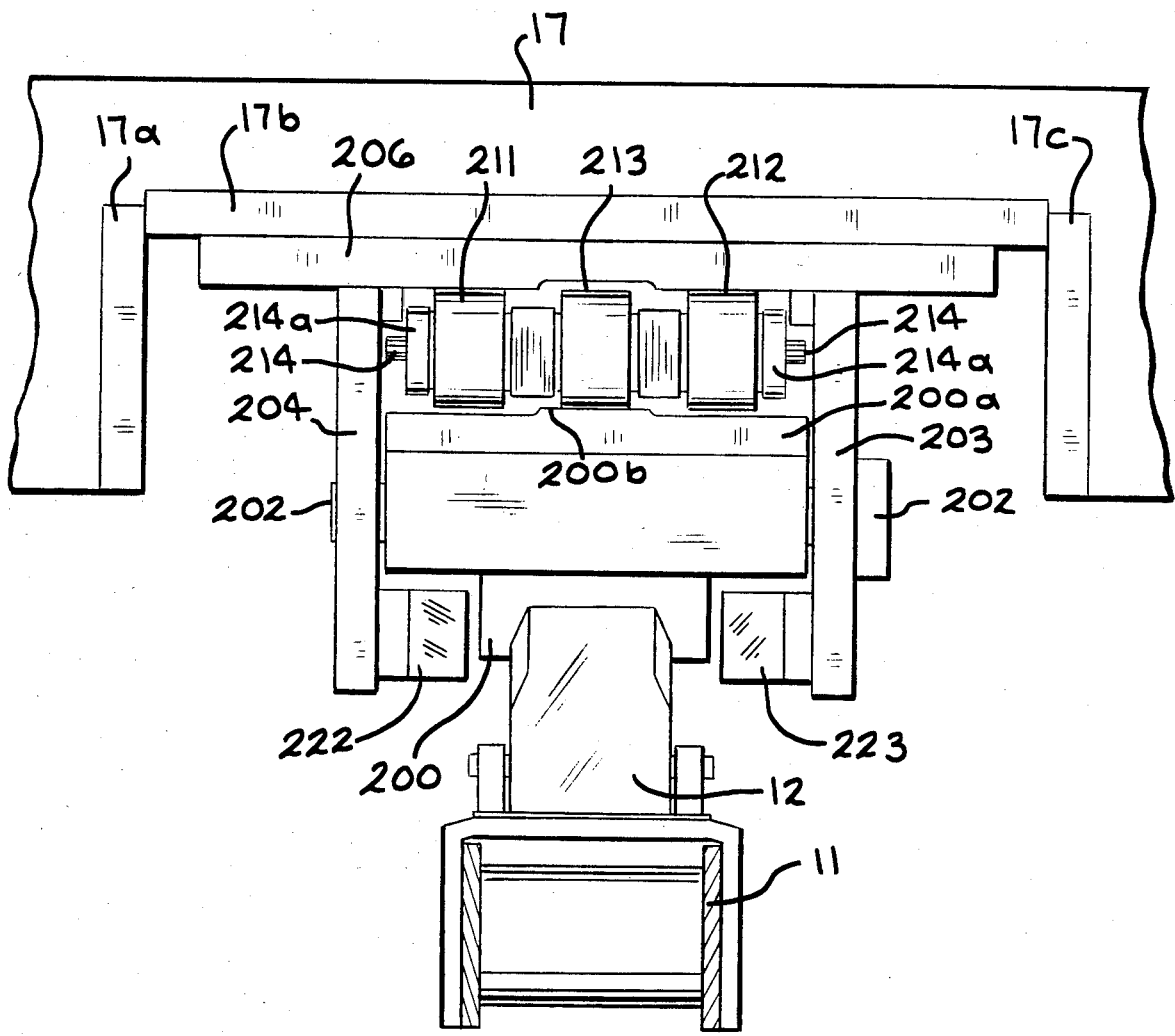
FIG. 7 is a left end cross sectional view along line 7—7 of FIG. 5.

FIGS. 5 to 7 show a preferred dog means 200 and releasing means 201 mounted on a truck 17 with a forward step plate 19 shown in parallel lines. As in the devices of FIGS. 2 to 4, the dog means 200 is pivotally mounted on a pivot pin 202 so that the pusher means 12 can rotate the dog means 200. The pivot pin 202 is mounted on a pair of spaced apart parallel side plates 203 and 204 (FIG. 7). The dog means 200 includes a retaining plate 200a which pivots on pin 202 in the same manner as the device shown in FIGS. 2 to 4. The retaining means 201 includes a rod 205 which is supported and guided by frame 206 and by bar 208 which is secured to frame 206. Cam pin 207 is mounted on rod 205. The rod 205 moves perpendicular to the axis of the pivot pin 202 and parallel to the retaining plate 200a. The rod 205 is biased to an extended position by a camming member 209 with a surface 209a which engages cam 207. The weight of the camming member or counterweight 209 urges the rod 205 in the forward direction on cam pin 207. The camming member 209 is pivoted on pin 210. The rod 205 includes a buttress plate 205a at the end which engages a pusher bar 21 as shown in FIG. 1. At the opposite end of the rod 205, multiple rollers 211, 212 and 213 are supported on pin 214 secured to the end of the rod 205 by retainer plates 214a (FIG. 7). The rollers 211 and 212 engage frame 206. The roller 213 engages a raised portion 200b of the retaining plate 200a. Thus the rod 205 is journalled by the retaining plate 200a and the frame 206.

The movement of the rollers 211, 212 and 213 and camming member 209 is shown in FIG. 5. When the rod 205 is pushed backwards to disengage the retaining plate 200a and dog means 200. An end plate 215 prevents the rod 205 from extending too far backwards and holds the retaining plate 200a in position when the roller 213 engages the retaining plate 200a. The device is secured to the truck 17 by channels 216 and 217 secured to frame 206 by bolts 218. A dust cover 219 is provided over camming member 209 secured by bolts 220. A guide 221 is provided on frame 206 to fit into the channel 205b of rod 205. Guides 222 and 223 are provided for orienting pusher means 12 correctly in relation to the dog means 200. As shown in FIG. 7, the frame 206 is mounted in truck 17 which has a box formed of sides 17a, 17b and 17c around an opening on the forward end of the truck 17.

As can be seen from FIG. 5, the rod 205 is pushed in the rearward direction by a stop (not shown) by a pusher bar 21 on a forward truck 17 engaging buttress plate 205a. The roller 213 is disengaged from the retaining plate 200a so as to allow the dog means 200 to pivot away from the pusher means 12. The camming member 209 is cammed upwards on the camming surface of cam pin 207. When the buttress plate 205a is disengaged, the camming member 209 extends the rod 205 in the forward direction thereby returning the dog means 200 to a locked or secured position.

As can be seen from the foregoing description, there are various means for extending the rod 105 or 205. Also the retaining plate 100a or 200a can be engaged by various bearing means on rod 105 or 205, preferably rollers 111 or 213. It is preferred to use the truck 17 as the carrier; however the carrier could be a tow trolly unit such as shown in U.S. Pat. No. 3,518,946 to Kavieff. It will be appreciated that various stop means can be used for the rod 105 or 205 to begin accumulation of a forward truck.

I claim:

1. In a power and free conveyor of the type having a carrier supported on at least one track which is moved along the track in a forward direction by a pusher means mounted on a propelling member adjacent the track which engages a dog means on the carrier, wherein the dog means on the carrier is releasable so as to accumulate the carrier when a releasing means on the carrier engages an obstacle in the path of the carrier to release the dog means the improvement in the releasing means and dog means which comprises:

(a) a linearly moveable rod mounted on the carrier in the forward direction as the releasing means, wherein the rod moves from an extended position to a depressed position along a longitudinal axis of the rod when an obstacle is engaged by the rod;

(b) dog means mounted on the carrier so as to be pivotal on a pivot axis perpendicular to the longitudinal axis of the rod, the dog means having a retaining plate extending from adjacent to the pivot axis in the forward direction and mounted on the carrier so that when the rod is in an extended position an end portion of the rod engages the retaining plate to prevent pivoting of the dog means when engaged by the pusher means and wherein when the rod is in a depressed position the retaining plate is disengaged from the end portion of the rod so that the dog means and retaining plate pivot upwards together when engaged by the pusher means and move back into position after the pusher means on the propelling member has moved ahead of the stopped carrier so that the dog means is re-engaged by a next proceding pusher means thus allowing stopping of the carrier on the track without stopping the propelling member thereby allowing accumulation of the carriers so long as the retaining plate and the end portion of the rod are disengaged; and (c) extending means which urges the rod to the extended position when the obstacle is disengaged from the rod.

2. The conveyor of claim 1 wherein the end portion of the rod has at least one bearing means which engages the retaining plate when the rod is in the extended position.

3. The conveyor of claim 2 wherein the end portion of the rod has two spaced apart bearing means mounted on an axis parallel to the pivot axis of the dog means on opposite sides of the rod and wherein each bearing means engages the retaining plate when the rod is in an extended position.

4. The conveyor of claim 1 wherein the extending means is a coil spring mounted around the rod along the longitudinal axis so as to engage an opposite end of the rod from the end portion of the rod and so as to engage the carrier and wherein when the spring is compressed the rod is in a depressed position.

5. The conveyor of claim 1 wherein a camming surface extends from the longitudinal axis of the rod and wherein a pivoted counterweight engages the camming surface, wherein the counterweight is pivoted to a cocked position when the rod is in a depressed position when the obstacle is encountered and wherein the counterweight moves the rod to the extended position when the obstacle is removed.

6. The conveyor of claim 1 wherein the carrier is a truck with four wheels mounted in two separate tracks and wherein the obstacle is a more forward truck or a stop means.

7. In a power and free conveyor of the type having multiple independent article carriers supported on at least one track which are moved along the track by a pusher means mounted on a propelling member adjacent which engages a dog means on the track carrier wherein the dog means on each carrier is releasable so as to accumulate the carrier when a releasing means on a rearward carrier engages a forward carrier or stop, the improvement in the releasing means which comprises:

(a) a linearly moveable rod mounted on the carriers so that the rod on the rearward carrier engages a rear portion of the forward carrier or a stop to produce linear movement of the rod from an extended position to a depressed position along a longitudinal axis of the rod;

(b) dog means pivotal on a pivot axis perpendicular to the longitudinal axis of the rod, the dog means having a retaining plate extending from the pivot axis towards the forward carrier and mounted adjacent to the rod on the rearward carrier so that when the rod is in an extended position an end portion of the rod engages the retaining plate to prevent pivoting of the dog means and wherein when the rod is in a depressed position the retaining plate is disengaged from the end portion so that the dog means and retaining plate pivot when engaged by a pusher means and move back into position after the pusher means on the propelling member has moved ahead of the stopped carrier so that the dog means is re-engaged by a next preceding pusher means and allows accumulation by the rearward carrier on the track so long as the retaining plate and the end portion of the rod are disengaged; and (c) extending means which urges the rod to the extended position when the forward carrier or stop is disengaged from the rearward carrier.

8. The conveyor of claim 7 wherein the end portion of the rod has at least one bearing means which engages the retaining plate when the rod is in the extended position.

9. The conveyor of claim 8 wherein the end portion of the rod has two spaced apart bearing means mounted on an axis parallel to the pivot axis of the dog means on opposite sides of the rod and wherein each bearing means engages the retaining plate when the rod is in an extended position.

10. The conveyor of claim 7 wherein the extending means is a coil spring mounted around the rod along the longitudinal axis so as to engage an opposite end of the rod from the end portion of the rod and so as to engage the carrier and wherein when the spring is compressed the rod is in a depressed position.

11. The conveyor of claim 7 wherein a camming surface extends from the longitudinal axis of the rod and wherein a pivoted counterweight engages the camming surface, wherein the counterweight is pivoted to a cocked position when the rod is in a depressed position when the obstacle is encountered and wherein the counterweight moves the rod to the extended position when the obstacle is removed.

12. An article truck with wheels adapted to be supported on one or more tracks to be moved in a forward direction by a pusher means mounted on a propelling member adjacent the track which pusher means engages a dog means on the truck, wherein dog means on the truck is releasable so as to accumulate the truck on the tracks when a releasing means on the truck engages an obstacle in the path of the truck the improvement in the releasing means mounted on the truck which comprises:

(a) a linearly moveable rod mounted on the truck in the forward direction, wherein the rod moves from an extended position to a depressed position along a longitudinal axis of the rod when an obstacle is engaged by the rod;

(b) dog means mounted on the truck so as to be pivotal on a pivot axis perpendicular to the longitudinal axis of the rod, the dog means having a retaining plate extending from adjacent to the pivot axis in the forward direction and mounted on the truck so that when the rod is in an extended position an end portion of the rod engages the retaining plate to prevent pivoting of the dog means when engaged by the pusher means and wherein when the rod is in a depressed position the retaining plate is disengaged from the end portion of the rod so that the dog means and retaining plate pivot when engaged by the pusher means and move back into position after the pusher means on the propelling member has moved ahead of the stopped carrier so that the dog means is re-engaged by a next preceding pusher means, thus allowing accumulation of the truck on the track so long as the retaining plate and the end portion of the rod are disengaged; and (c) extending means which urges the rod to the extended position when the obstacle is disengaged from the rod.

13. The truck of claim 12 wherein the end portion of the rod has at least one bearing means which engages the retaining plate when the rod is in the extended position.

14. The truck of claim 13 wherein the end portion of the rod has two spaced apart bearing means mounted on an axis parallel to the pivot axis of the dog means on opposite sides of the rod and wherein each bearing means engages the retaining plate when the rod is in an extended position.

15. The truck of claim 12 wherein the extending means is a coil spring mounted around the rod along the longitudinal axis so as to engage an opposite end of the rod from the end portion of the rod and so as to engage the truck and wherein the spring is compressed the rod is in a depressed position.

16. The truck of claim 12 wherein a camming surface extends from the longitudinal axis of the rod and wherein a pivoted counterweight engages the camming surface, wherein the counterweight is pivoted to a cocked position when the rod is in a depressed position when the obstacle is encountered and wherein the counterweight moves the rod to the extended position when the obstacle is removed.

17. A releasing means for a power and free conveyor of the type having an carrier supported on at least one track which is moved along the track in a forward direction by a pusher means mounted on a propelling member adjacent the track which engages a dog means on the carrier, wherein the dog means on the carrier is releasable so as to accumulate the carrier when a releasing means on the carrier engages an obstacle in the path of the carrier to release the dog means the improvement in the releasing means and dog means which comprises:

(a) a linearly moveable rod mounted on the carrier in the forward direction, wherein the rod moves from an extended position to a depressed position along a longitudinal axis of the rod when an obstacle is engaged by the rod;

(b) dog means mounted on the carrier so as to be pivotal on a pivot axis perpendicular to the longitudinal axis of the rod, the dog means having a retaining plate extending from adjacent to the pivot axis in the forward direction and mounted on the carrier so that when the rod is in an extended position an end portion of the rod engages the retaining plate to prevent pivoting of the dog means when engaged by the pusher means and wherein when the rod is in a depressed position the retaining plate is disengaged from the end portion of the rod so that the dog means and retaining plate pivot when engaged by the pusher means and move back into position after the pusher means on the propelling member has moved ahead of the stopped carrier so as to be re-engaged by a next preceding pusher means thus allowing accumulation of the carrier on the track so long as the retaining plate and the end portion of the rod are disengaged; and (c) extending means which urges the rod to the extended position when the obstacle is disengaged from the rod.

18. The releasing means of claim 17 wherein the end portion of the rod has at least one bearing means which engages the retaining plate when the rod is in the extended position.

19. The releasing means of claim 18 wherein the end portion of the rod has two spaced apart bearing means mounted on an axis parallel to the pivot axis of the dog means on opposite sides of the rod and wherein each bearing means engages the retaining plate when the rod is in an extended position.

20. The releasing means of claim 17 wherein the extending means is a coil spring mounted around the rod along the longitudinal axis so as to engage an opposite end of the rod from the end portion of the rod and so as to engage the carrier and wherein when the spring is compressed the rod is in a depressed position.

21. The releasing means of claim 17 wherein a camming surface extends from the longitudinal axis of the rod and wherein a pivoted counterweight engages the camming surface, wherein the counterweight is pivoted to a cocked position when the rod is in a depressed position when the obstacle is encountered and wherein the counterweight moves the rod to the extended position when the obstacle is removed.

* * * * *